(12) United States Patent
Fletcher

(10) Patent No.: US 8,506,339 B2
(45) Date of Patent: Aug. 13, 2013

(54) FLOATING PLATFORM FOR MOTORIZED DECOYS

(76) Inventor: David Mark Fletcher, Palmetto, GA (US)

(*) Notice: Subject to any disclaimer, the term of this patent is extended or adjusted under 35 U.S.C. 154(b) by 104 days.

(21) Appl. No.: 13/066,312

(22) Filed: Apr. 12, 2011

(65) Prior Publication Data
US 2012/0260840 A1 Oct. 18, 2012

(51) Int. Cl.
*B63B 22/00* (2006.01)
*A01M 31/06* (2006.01)

(52) U.S. Cl.
USPC .............................. 441/1; 441/35; 43/3

(58) Field of Classification Search
USPC ................ 441/35, 45, 1; 114/123; 43/3
See application file for complete search history.

(56) References Cited

U.S. PATENT DOCUMENTS

| | | | | |
|---|---|---|---|---|
| 3,099,912 A | * | 8/1963 | Wolff | 405/207 |
| 3,504,753 A | * | 4/1970 | Rutley | 180/14.7 |
| 3,656,749 A | * | 4/1972 | Reyes | 473/485 |
| 4,337,543 A | * | 7/1982 | Van Ulzen | 114/354 |
| 4,896,448 A | | 1/1990 | Jackson | |
| 5,136,800 A | | 8/1992 | Lanius | |
| 5,179,907 A | * | 1/1993 | Galbraith | 116/209 |
| 5,377,439 A | | 1/1995 | Roos et al. | |
| 5,479,870 A | * | 1/1996 | Corzine | 114/108 |
| 5,594,669 A | * | 1/1997 | Heger | 702/154 |
| 5,832,650 A | | 11/1998 | Franceschini | |
| 6,408,559 B2 | | 6/2002 | Mathews | |
| 6,460,284 B1 | | 10/2002 | Rabo | |
| 6,475,048 B2 | * | 11/2002 | Gredy | 441/129 |
| 6,487,811 B2 | | 12/2002 | Barrett | |
| 6,574,903 B2 | | 6/2003 | Solomon | |
| 6,748,690 B2 | | 6/2004 | Igo | |
| 7,131,230 B1 | | 11/2006 | Gilsdorf | |
| 7,610,713 B1 | | 11/2009 | Eilers | |
| 2003/0204983 A1 | * | 11/2003 | Porter | 43/3 |
| 2004/0025400 A1 | | 2/2004 | Salato | |
| 2008/0178512 A1 | | 7/2008 | Lessmann | |
| 2009/0126253 A1 | | 5/2009 | Wood et al. | |
| 2010/0287811 A1 | | 11/2010 | Ivie | |

* cited by examiner

*Primary Examiner* — Stephen Avila
(74) *Attorney, Agent, or Firm* — J. T. Hollin, Jr.

(57) ABSTRACT

Disclosed is a floating platform suitable for supporting a motorized fowl decoy upon a post attached to the platform. The floating platform comprises a rectangular-shaped solid base portion having a vertically-mounted post attached to the top surface of the platform. Hingedly attached to each long side of the base is a foldable wing frame, each wing frame being a quadrilateral assembly of two longitudinal members and two lateral members, connected by four 90-degree elbows. The longitudinal member of each wing frame is pivotally attached to each long side of the base. The base and each wing are further enclosed in lightweight material to ensure buoyancy of the entire floating platform. The device is easily transportable by pivoting the wing frames upward and carrying the device in the manner of a briefcase.

6 Claims, 4 Drawing Sheets

FLOATING PLATFORM FOR MOTORIZED DECOYS

REFERENCE TO RELATED APPLICATION

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concept presented herein is generally concerned with devices that provide for the deployment of motorized fowl decoys, particularly as used in the pursuit of hunting ducks, geese, dove, and other flying game. For more than a century avid hunters have devised and improved all types of equipment, including blinds, ammunition, hunting lights, wet gear, decoys, and decoy accessories. The inventive concept disclosed herein demonstrates an easy-to-use platform upon which a hunter may mount any of a variety of motorized decoys.

The platform consists of a horizontal, buoyant base with a vertical post attached to, and projecting upward from the base. The post is compatible with the vast majority of support poles which extend vertically downward from the body of the motorized decoy. The ease of operation of the device makes its fold-out deployment simple, and it can be used on a water surface or on land. The floating platform can be used in deep or shallow water, in rough water, or fast-moving currents. An integral anchor keeps it relatively localized on the area of water near the hunter's position. Upon leaving the hunting locale, the user simply folds up the "wingframes" of the device, making it easily transportable, similar to an item of luggage.

(2) Description of the Related Art

The following publications are motorized decoy devices that generally are constructed with their own integral floating apparatus. Many of them are similar in nature, or perform some of the same functions as the disclosed device.

US patent application publication #2010/0287811 A1 (Nov. 18, 2010; Ivie, R.) Presents a decoy device mounted on a support in an elevated position on a post attached to the support. The platform member is formed from a material with sufficient buoyancy to allow the support to substantially float in the water with the decoy device mounted thereto.

U.S. Pat. No. 7,610,713 (Nov. 3, 2009; Eilers, T.) is an invention featuring a decoy fin having a unitary body divided into at least three generally planar sections. These sections combine to form a generally helical surface which, when submerged in moving water, will generally induce a cyclical oscillatory movement. The anchor, decoy fin, decoy and tether lines are all operative to move the decoy therewith through an oscillatory pattern.

US patent application publication #2009/0126253 A1 (May 21, 2009; Wood, et. al) comprises a waterfowl decoy that includes a suction bottom main body in combination with a removable keel.

US patent application publication #2008/0178512 A1 (Jul. 31, 2008; Lessman, M.) This device illustrates an improved waterfowl decoy includes a molded plastic main body including an underside, the main body having the general configuration of a selected waterfowl and a keel structure including a longitudinal extended hollow keel tube mounted on the underside of the main body. An anchor weight fits within the hollow keel tube when the generally tangle-free anchor line is pulled up and through the hollow keel tube.

U.S. Pat. No. 7,131,230 (Nov. 7, 2006; Gilsdorf, R.) is a device which is a game bird decoy having movable wings that exhibit a lifelike stimulation of a game bird in flight.

US patent application publication #2004/0025400 (Feb. 12, 2004; Salato, J.) features a motion waterfowl decoy which has a body with two sets of eyelet guides. An actuator is connected to the upper portion of the wings and passes through at least one set of eyelet guides. The actuator and guides are configured to confer movement to the wing by flexing the wing downwardly and inwardly.

U.S. Pat. No. 6,748,690 (Jun. 15, 2004; Igo, M.) comprises a decoy for attracting waterfowl having an upper body portion adjustably pivotally connected to a keel by an attachment device. The attachment device allows the keel to be alternatively oriented and locked into a variety of positions and orientations, thus to take advantage of water movement to induce simulated motion of the decoy.

U.S. Pat. No. 6,574,903 (Jun. 10, 2003; Solomon, W.) This invention addresses an improved method of animating a waterfowl decoy or bird sculpture. An offset support assembly supports wings and paddle appendages that attach to a rotating or oscillating output shaft, which produces a visual quality replicating the flapping of wings.

U.S. Pat. No. 6,487,811 (Dec. 3, 2002; Barrett, K.) features a waterfowl decoy with a self-retracting anchor line and further includes a body defining a closed interior space in which is disposed a spring biased anchor line reel.

U.S. Pat. No. 6,460,284 (Oct. 8, 2002; Rabo, F.) is a device featuring a bird decoy and method for providing simulated wing motion. The wing simulating structure mounted to support a base for holding the wing simulating structure positioned with an upper surface thereof facing upwards at least some of the time. Included is an electrical power source operatively connected for powering an electric illuminant, the illuminant preferably being multiple LEDs positioned to illuminate the upper surface of the wing simulating structure.

U.S. Pat. No. 6,408,559 (Jun. 25, 2002; Mathew, R.) comprises an animated waterfowl decoy apparatus included a decoy housing, a pair of decoy wing members rotatably connected to the decoy housing, and an elongated stand. The apparatus may be readily converted between wind-powered operation and motor powered operation.

U.S. Pat. No. 5,832,650 (Nov. 10, 1998; Franceschini, A.) is a self-righting stabilizing adaptor for a floating waterfowl decoy. The adaptor effectively lowers the center of gravity of the decoy so that, in the event the decoy is placed onto a body of water upside down, the decoy will tip upright.

U.S. Pat. No. 5,377,439 (Jan. 3, 1995; Roos et al.) is a device which is a remotely controlled floating decoy having a buoyant body resembling a game bird and further, having a receiver disposed within the buoyant body. The apparatus also has a propulsive device and rudder coupled to a rear end of the buoyant body. The propulsive device and the rudder cooperate to provide directed locomotion for the buoyant body in response to commands transmitted from the transmitter.

U.S. Pat. No. 5,136,800 (Aug. 11, 1992; Lanius, C.) features a bird decoy which can be used either on land or in water.

The bottom of the body portion defines a central, downwardly—opening cavity which is adapted to receive another body portion in a stackable relationship.

U.S. Pat. No. 4,896,448 (Jan. 30, 1990; Jackson, L.) discloses a bird decoy including a body and a flapping mechanism mounted therein. The flapping mechanism moves a pair of wings, which oscillate with respect to the body. The flapping mechanism includes a battery-operated motor.

A commercial device currently on the market has many similar features to the inventive concept herein. The "Mighty Duck Spinning Wing Floating Duck Decoy Board," is marketed by Mack's Prairie Wings of Stuttgart, Ark. (www.mackspw.com). The product is a rectangular-shaped board made of high density Styrofoam and 900 denier nylon material. It likewise features a permanently-attached, vertically protruding post upon which motorized decoys may be mounted.

BRIEF SUMMARY OF THE INVENTIVE CONCEPT

The inventive concept herein discloses a floating platform upon which a hunter may mount any of several motorized fowl decoys. The floating platform is comprised of three components: a generally rectangular-shaped solid base, a left-side four-membered rectangular structure, and a right-side four-membered rectangular structure. Both the left-side and right-side rectangular structures are referred to as "wing frames." The two wing frames are hingedly attached, by a pair of pivotal means, one pair on each of the long sides of the base. The paired pivotal means at the sides of the base permit each of the wing frames to be hingedly rotated about an axis parallel to the respective long sides of the base. When the two wing frames are rotated to a position where each of the planes defined by the wing frames is parallel to the top surface of the base, the floating platform is at its ultimate useable configuration.

The bottom surface and all four edges of the base are encased in a medium density foam material. Likewise, the four members of each wing frame are wrapped in the same foam material, the result being enhanced buoyancy for the entire floating platform. It should be specifically noted that both the left wing frame and the right wing frame may be unitary structures and further, may be entirely constructed from buoyant materials. A vertically-oriented, hollow, square cross-sectioned post is securely attached to a mounting plate, said mounting plate being permanently attached to the top surface of the base. It is upon the top end of the hollow post that a user would attach his/her choice of a motorized decoy.

BRIEF DESCRIPTION OF THE VIEWS OF THE DRAWINGS

The objects, features, and advantages of the concept presented in this application are more readily understood when referring to the accompanying drawings. The drawings, totaling five figures, show the basic functions of various embodiments and methods. In the several figures, like reference numbers are used in each figure to correspond to the same component as may be depicted in other figures.

NOMENCLATURE FOR INVENTION COMPONENTS

Figure 1:
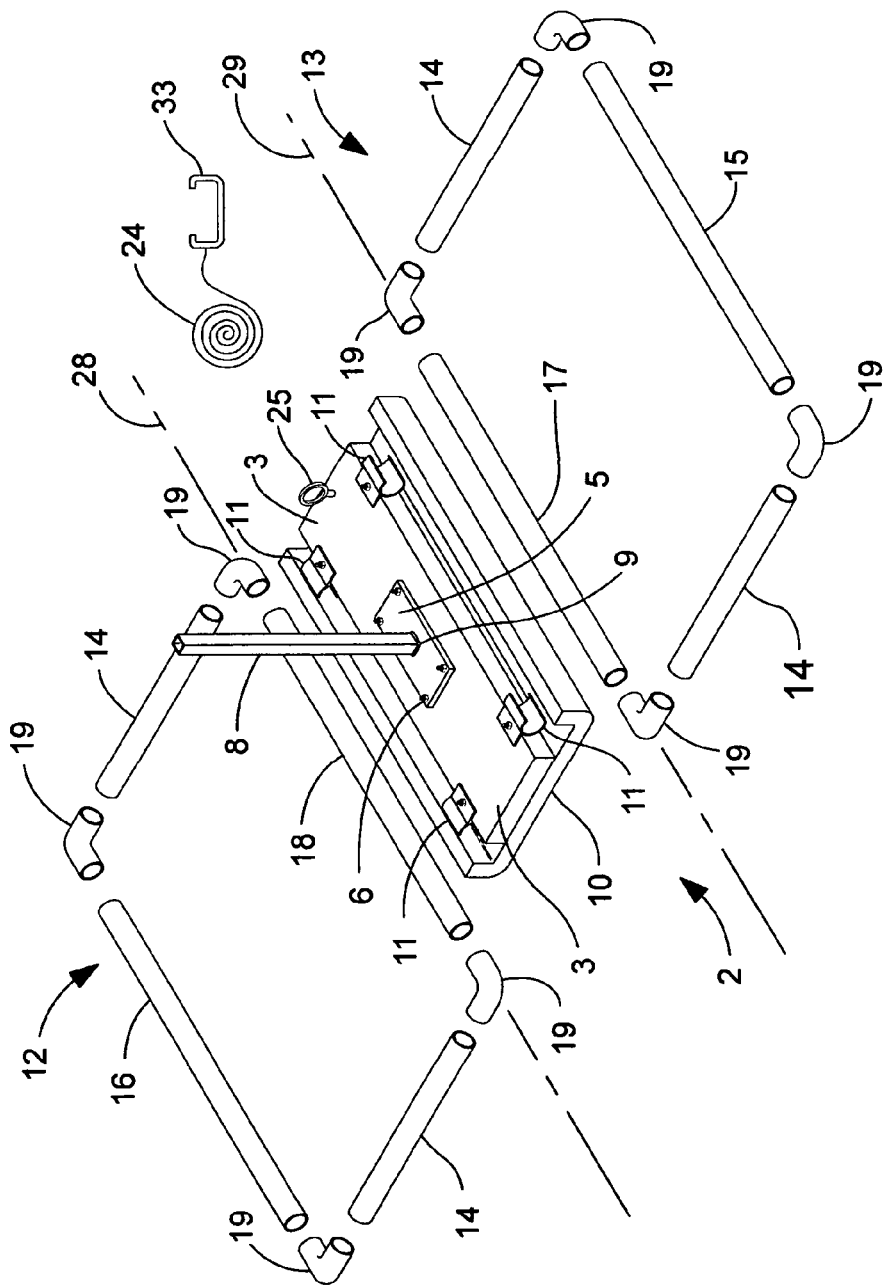
FIG. 1 presents an exploded view of the basic components of the invention, including the base section, the left wing frame, and the right wing frame.

| | |
|---|---|
| 1. | Floating platform |
| 2. | Base |
| 3. | Base top surface |
| 4. | Base bottom surface |
| 5. | Mounting plate |
| 6. | Mounting bolts (4) |
| 7. | n/a |
| 8. | Mounting post |
| 9. | Weld |
| 10. | Base foam wrap |
| 11. | Circular retaining clip (4) |
| 12. | Left wing frame |
| 13. | Right wing frame |
| 14. | Lateral member (4) |
| 15. | Right longitudinal member |
| 16. | Left longitudinal member |
| 17. | Right center member |
| 18. | Left center member |
| 19. | Elbow (8) |
| 20. | Lateral foam wrap |
| 21. | Longitudinal foam wrap |
| 22. | Large binding straps (4) |
| 23. | Small binding straps (14) |
| 24. | Retaining cable |
| 25. | Cable hook |
| 26. | Base left side |
| 27. | Base right side |
| 28. | Axis of left center member |
| 29. | Axis of right center member |
| 30. | Bottom of base |
| 31. | Front of base |
| 32. | Back of base |
| 33. | Anchor |
| 34.-39 | n/a |
| 40. | Custom lateral foam wrap |
| 41. | Custom longitudinal foam wrap |

DETAILED DESCRIPTION OF THE INVENTIVE CONCEPT

As we view FIG. 1, which is an exploded view of the device prior to its final assembly, it can be seen that the rudimentary components of the inventive concept are essentially a solid rectangular base 2 unit enclosed in a buoyant foam wrap 10, to which is attached two foldable, buoyant "wing frames" 12, 13. Attached to the top surface 3 of the base 2 unit is a mounting post 8 which is affixed to a mounting plate 5. The mounting post 8 may comprise a variety of geometric cross-sections in order to accommodate the mechanical design of a particular motorized decoy currently available, or that may become available at a future date. The preferred embodiment, as illustrated in FIG. 1, comprises a hollow, square cross-section mounting post 8 oriented perpendicularly to the top surface 3 of the base 2. The mounting post 8 can accommodate substantially all motorized decoys that are currently on the market. This is so due to the fact that the vast majority of motorized bird or fowl decoys are constructed with a permanently-embedded, square cross-sectioned support pole constructed onto the bottom, or stomach, of the decoy.

Again referring to FIG. 1, it is seen that the left wing frame 12 is constructed of a left longitudinal member 16, two left lateral members 14, and a left center member 18. Similarly, the right wing frame 13 is constructed of a right longitudinal member 15, two right lateral members 14, and a right center member 17. On both the left wing frame 12 and the right wing frame 13 the corresponding lateral and longitudinal members are orthogonally connected, in alternating sequence, by four 90-degree elbows 19, thereby forming a planar rectangular structure, wing frame. The wing frame 12, 13 members 14, 15, 16, 17, 18, and 19 are shown, strictly for illustrative purposes, as hollow tubes, similar to common PVC piping. Other embodiments of this inventive concept, or any future improvements to the concept, may easily utilize a variety of lightweight materials of any cross-sectional shape to comprise the wing frame 12, 13 members. Further, to enhance the effectiveness of the device, the materials, or any outer covering may be comprised of a camouflage-type color and pattern.

Figure 2:
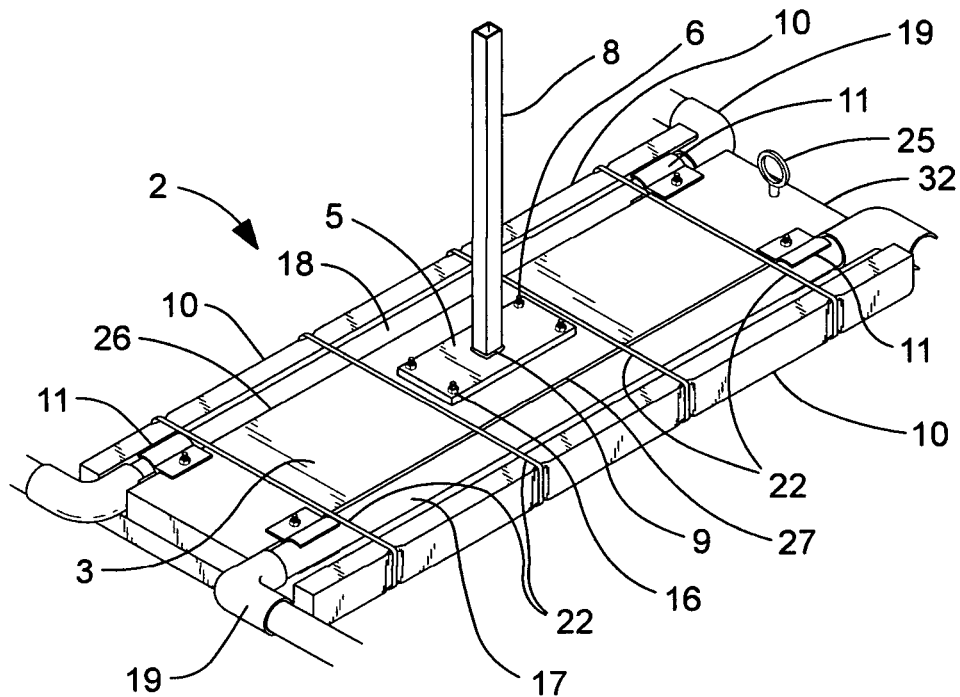
FIG. 2 depicts the base section and its components, with the base foam wrap shown strapped in place.

FIG. 2 is an isolated view of the base 2 of the device. Permanently affixed to the base 2 left side 26 are two circular retaining clips 11. Each circular retaining clip 11 comprises a circular inner surface which corresponds to the curvilinear outer surface of the left center member 18. The circular retaining clips thereupon serve as attachment mechanisms to secure the left center member 18 to the base 2. This in turn, allows the left center member 18 to be rotated, with some resistance, within the grasp of the retaining clips 11. Similarly, on the base 2 right side 27 there also exist two circular retaining clips 11 serving dually as an attachment means and a pivotal means for the right center member 17, enabling rotation of the right wing frame 13.

The same functions which are performed by the displayed circular retaining clips 11, the clips may also be accomplished by several different classes of mechanisms, including hinges, springs, clamps, yokes, or any device which allows either or both center members 17, 18 of each respective wing frame 12, 13 to rotate or pivot about the longitudinal axis of the respective center member 17, 18 (shown in both FIG. 1 and FIG. 2) of each wing frame 12, 13.

Figure 3:
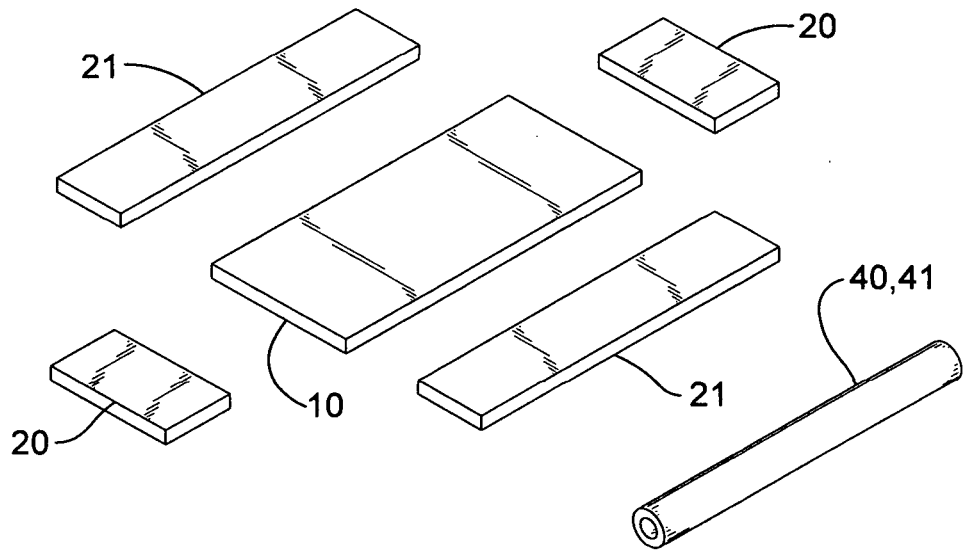
FIG. 3 shows the various sizes and configurations of foam wrap sections prior to them being wrapped around corresponding frame members.

FIG. 3 illustrates the various configurations and sizes of foam wrap material that may be used in the construction of the device. One embodiment of the device utilizes rectangular-shaped foam wrap materials designated as the base foam wrap 10, lateral foam wrap 20, and longitudinal foam wrap 21. The material comprising the base foam wrap 10 is used to enclose the base 2 of the device, as is more clearly shown in FIG. 1 and FIG. 2. FIG. 1 displays base foam wrap 10 material being adhesively attached to the bottom of the device base 2. This is contrasted with FIG. 2 which presents an embodiment of the device wherein the base foam wrap 10 is secured to the base 2 by means of four large binding straps 21 extending from side-to-side of the base 2.

Figure 4:
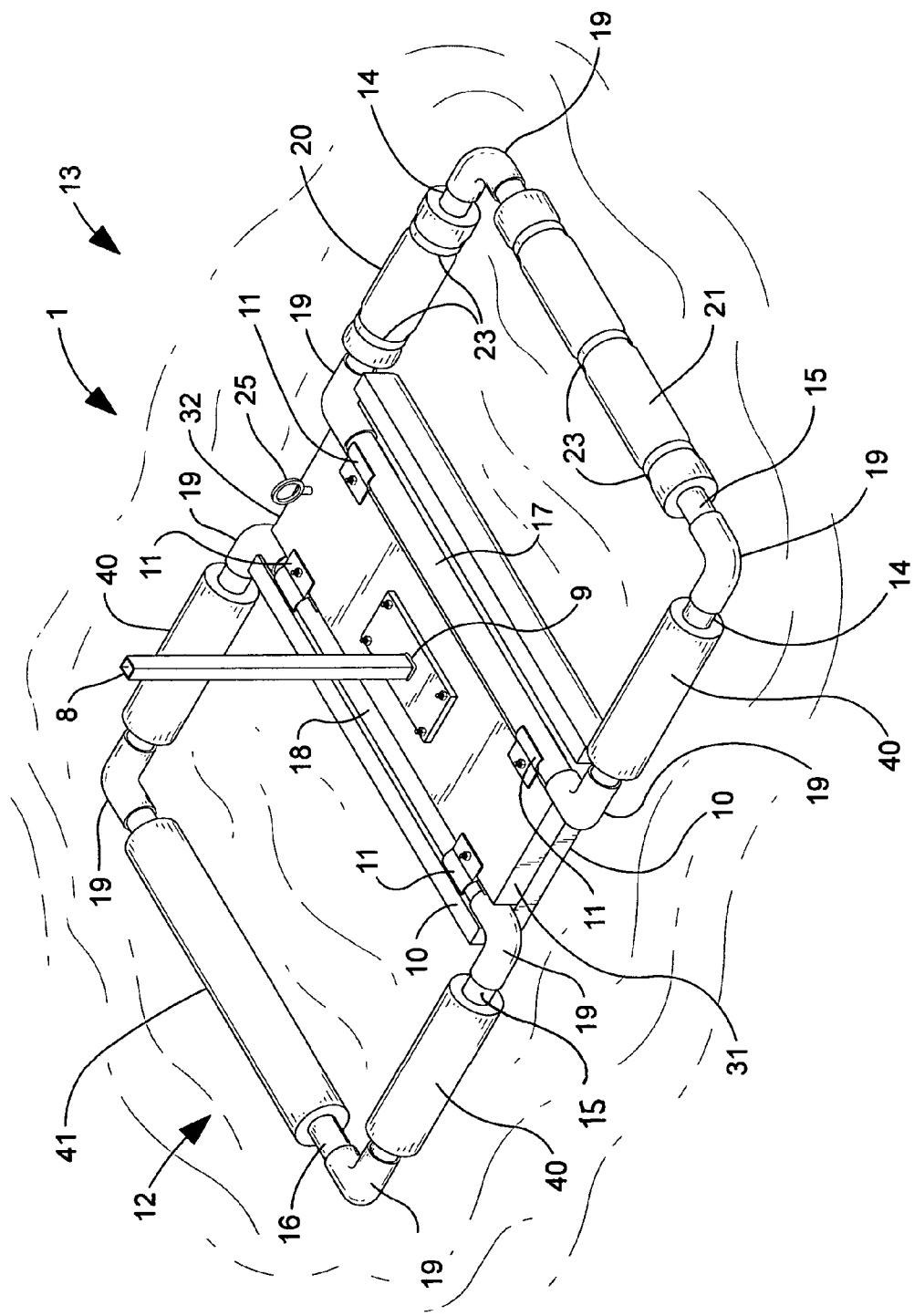
FIG. 4 illustrates the device deployed upon the surface of a body of water.

Sections of lateral foam wrap 20, as shown in FIG. 3, may be used to enclose the two lateral members 14 on each wing frame 12, 13 in one embodiment of the device. Sections of longitudinal foam wrap 21 may be used to circumferentially enclose the longer right longitudinal member 15 and the left longitudinal member 16. Foam wrap sections 20 and 21 must be secured to their respective frame members 15, 16, 17, and 18 by the use of shorter, small binding straps 23. This particular securing method is illustrated in FIG. 4, as explained below. The preferred embodiment of the inventive concept utilizes custom lateral foam wraps 40 which fit snugly over each lateral frame member 14 and custom longitudinal foam wraps 41, which fit securely about the outer length of either the right longitudinal member 15 or the left longitudinal member 16.

In referring to FIG. 4, there is displayed a device depicted as deployed on the surface of a body of water. This drawing further illustrates the use of the differing methods of securing the foam wrap sections to the device components. In particular, as we focus on the right wing frame 13, there is utilized a longitudinal foam wrap section 21 which is secured about the right longitudinal member 15 by means of three small binding straps 23. The right wing frame 13 further exhibits a lateral foam wrap section 20 secured about a lateral member 14 by use of two small binding straps 23. The remaining frame member of the right wing frame 13 is shown with a custom lateral foam wrap 40 enclosing the opposite lateral member 14. In contrast, the left wing frame 12 is shown with its two lateral members 15 and its left longitudinal member 16 enclosed by the custom lateral foam wrap 40 and the custom longitudinal foam wrap 41, respectively. The custom foam wraps 40 and 41 fit securely about the outer surface of the lateral members 15 and the longitudinal member 16 and therefore need no strap for securing in place.

As stated earlier, the preferred embodiment of the device utilizes all custom foam wrap sections. FIG. 4 further depicts the vertically-attached mounting post 8 as it is welded 9 to the top surface of the mounting plate 5. Also shown is a cable hook 25 which serves to fasten the retaining cable 24 to the top surface 3 of the base 2. The retaining cable 24 is hooked, at its distal end, to an anchor 33 (shown in FIG. 1). The anchor 33 may be used to prevent wayward drifting of the device in slight water currents or under windy weather conditions. The cable itself may consist of wire, rope, cord, or length of line of any durable material.

The embodiment shown in FIG. 4 also shows that the right center member 17 and the left center member 18 of each respective wing frame 12, 13 function as the pivoting member of the respective wing frames 12, 13. The center members 17, 18 are attached to the base right side 27 and the base left side 26 by means of the circular retaining clips 11. The floating platform 1 is thus in its operational mode with both wing frames 12, 13 pivoted outward from the respective sides of the base 2 such that the uni-planes formed by each of the wing frames 12, 13 are parallel to the top surface 3 of the base 2. The user will have beforehand, inserted the support pole of any of several motorized decoys into the hollow top of the post 8.

Figure 5:
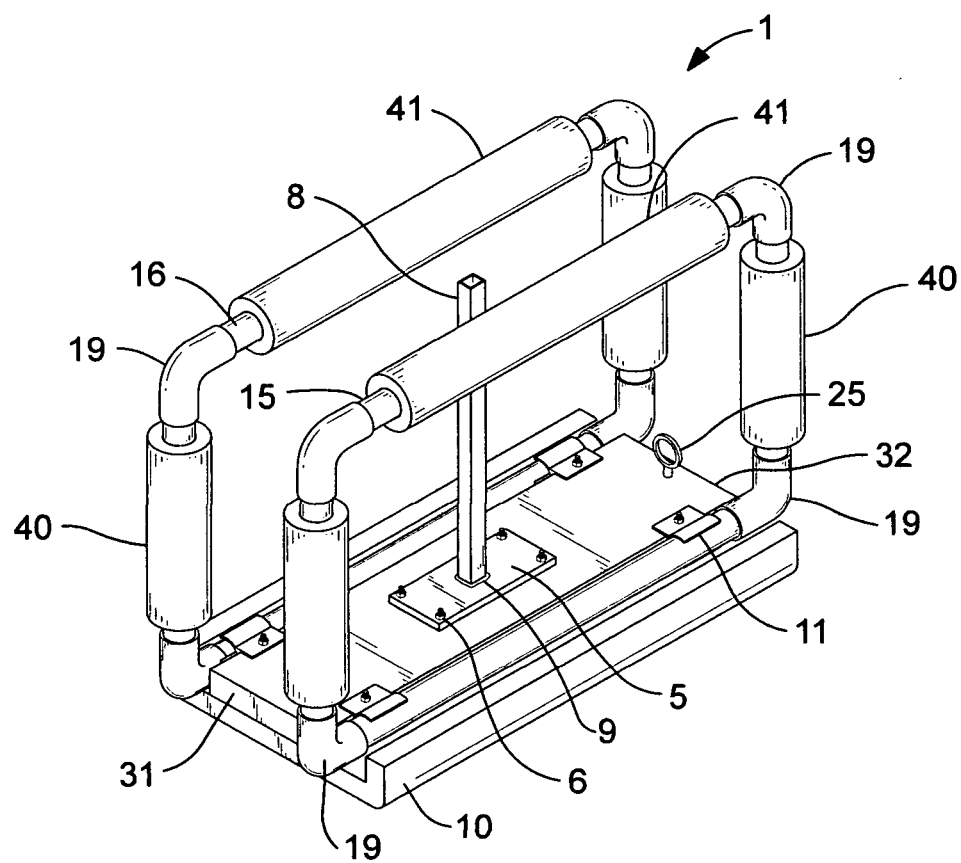
FIG. 5 shows the device folded up into its portable configuration.

As we view FIG. 5, the inventive concept is shown in its portable configuration. The two wing frames 12, 13 have been pivoted upward such that the left longitudinal member 16 and the right longitudinal member 15 are parallel and situated a few inches from each other, thus enabling the user to grasp the two longitudinal members 15, 16 with one hand for transporting the device. FIG. 5 also depicts the preferred embodiment of the device, with all wing frame members enclosed with custom-fitted lateral foam wraps 40, 41.

Once a hunting session is finished, the user may tow the floating platform 1 across the water surface to shore or onto a boat by reeling in the cable 24 which would be attached to the floating platform 1 by a cable hook 25. The floating platform 1 may then be lifted out of the water and the left and right wing frames 12, 13 are pivotally folded up toward the mounting post 8 whereupon the longitudinal members 15, 16 may be grasped together and the device carried in the manner of a suitcase.

While preferred embodiments of the present inventive concept have been shown and disclosed herein, it will be obvious to those persons skilled in the art that such embodiments are presented by way of example only and not as a limitation to the scope of the inventive concept. Numerous variations, changes, and substitutions may occur or be suggested to those skilled in the art without departing from the intent, scope, and totality of the inventive concept. Such variations, changes, and substitutions may involve other features which are already known per se and which may be used instead of, or in addition to, features already disclosed herein. Accordingly, it is intended that this inventive concept not be limited by the scope of the accompanying claims.

What is claimed is:

1. A platform for supporting motorized fowl decoys, comprising
an orthogonal, rectangular base; a hollow mounting post vertically attached to a mounting plate permanently affixed atop said base; a left rectangular wing frame pivotally attached to the left side of the rectangular base; and a right rectangular wing frame pivotally attached to the right side of said rectangular base, wherein each wing frame may pivot within a ninety degree range, said range measured from the orientation of the planes of said wing frames being parallel to said base, to a position where the planes of said wing frames are pivotally positioned perpendicular to said base; and further;
wherein said base, said left wing frame, and said right wing frame are each separately enclosed in a buoyant foam material.

2. A platform, for supporting motorized fowl decoys comprising,
a buoyant, orthogonal rectangular base having a top surface, a bottom surface, a left side, a right side, a front end, and a back end;
a hollow mounting post having a square cross section, vertically attached to the top surface of said base by means of a mounting plate affixed to said top surface;
a left rectangular wing frame comprising one center member, one longitudinal member and two parallel lateral members, all members alternatingly joined so as to form a planar structure; and
a right rectangular wing frame comprising one center member, one longitudinal member and two parallel lateral members, all members alternatingly joined so as to form a planar structure;
wherein the center member of said left wine frame wing and the center member of said right wine frame wine are attached to the left side of said base and the right side of said base respectively, by utilizing a plurality of fasteners having a means for allowing ninety degrees of rotational movement about the longitudinal axis of each said center member, said ninety degrees being measured from the orientation of the planes of said wing frames being parallel to said base, to a position where the planes of said wing frames are pivotally positioned perpendicular to said base; and further,
wherein the bottom surface and both sides of said base, the lateral members and longitudinal member of said left wing frame, and the lateral members and longitudinal member of said right wing frame are individually enclosed in a buoyant foam material and further, said platform comprises a hook attached to the top surface of said rectangular base, an anchor, and retaining cable.

3. A platform as in claim 1, further comprising a cable having its proximal end attached to the top surface of said rectangular base and its distal end attached to an anchor.

4. A buoyant platform for supporting a motorized fowl decoy, comprising
an orthogonal, rectangular base; a mounting cyst vertically attached to a mounting plate permanently affixed atop said base; a left rectangular wing frame pivotally attached to the left side of said rectangular base; and a right rectangular wing frame wing pivotally attached to the right side of said rectangular base, wherein each wing frame may pivot within a ninety degree range, said range measured from the orientation of the planes of said wing frames being parallel to said base, to a position where the planes of said wing frames are positioned perpendicular to said base, and
further comprising a mounting post having a means for attaching a motorized decoy to the top section of said mounting post and further, having a plurality of circular retaining clips attaching the left and right wing frames, respectively to the left and right sides of said base.

5. A platform as in claim 4, wherein said platform further comprises a hook attached to the top surface of said rectangular base, an anchor, and a retaining cable.

6. A platform for supporting motorized fowl decoys, comprising
a buoyant, orthogonal rectangular base having a top surface, a bottom surface, a left side, a right side, a front end, and a back end
a hollow mounting post having a square cross section, vertically attached to the top surface of said base by means of a mounting plate affixed to said top surface;
a left rectangular wing frame comprising one center member, one longitudinal member and two parallel lateral members, all members alternatingly joined so as to form a planar structure; and
a right rectangular wing frame comprising one center member, one longitudinal member and two parallel lateral members, all members alternatingly joined so as to form a planar structure;
wherein the center member of said left wing frame wing and the center member of said right wing frame wing are attached to the left side of said base and the right side of said base, respectively, by utilizing a plurality of fasteners having a means for allowing ninety degrees of rotational movement about the longitudinal axis of each said center member, said ninety degrees being measured from the orientation of the planes of said wing frames being parallel to said base, to a position where the planes of said wing frames are pivotally positioned perpendicular to said base; and
further comprising a mounting post having a means for attaching a motorized decoy to the top section of said mounting post and further, having a plurality of circular retaining clips attaching the left and right wing frames, respectively to the left and right sides of said base.

* * * * *